United States Patent
Ikonen

(10) Patent No.: US 9,734,963 B2
(45) Date of Patent: Aug. 15, 2017

(54) APPARATUS, SYSTEM AND METHOD FOR A SIDE ACTUATOR ARRANGEMENT

(71) Applicant: Nokia Technologies Oy, Espoo (FI)

(72) Inventor: Jorma Ikonen, Vartsala (FI)

(73) Assignee: Nokia Technologies Oy, Espoo (FI)

( * ) Notice: Subject to any disclaimer, the term of this patent is extended or adjusted under 35 U.S.C. 154(b) by 168 days.

(21) Appl. No.: 14/468,069

(22) Filed: Aug. 25, 2014

(65) Prior Publication Data
US 2015/0075956 A1    Mar. 19, 2015

(30) Foreign Application Priority Data
Sep. 13, 2013 (GB) .................................. 1316311.8

(51) Int. Cl.
*H01H 13/10* (2006.01)
*H01H 13/52* (2006.01)
*H04M 1/23* (2006.01)

(52) U.S. Cl.
CPC ............ *H01H 13/52* (2013.01); *H04M 1/236* (2013.01); *H01H 2215/004* (2013.01); *H01H 2221/058* (2013.01); *H01H 2223/01* (2013.01); *H01H 2225/028* (2013.01); *H01H 2231/022* (2013.01); *Y10T 29/49105* (2015.01)

(58) Field of Classification Search
CPC ....... H01H 2231/022; H01H 2221/058; H01H 13/52; H01H 2223/01; H01H 2225/028; H01H 2215/004; H04M 1/236; Y10T 29/49105
USPC ............ 200/294, 5 A, 5 R, 343, 51 R, 51.09
See application file for complete search history.

(56) References Cited

U.S. PATENT DOCUMENTS

| | | | |
|---|---|---|---|
| 4,204,098 A * | 5/1980 | Strande | .................... H01H 1/24 200/1 R |
| 5,963,045 A | 10/1999 | Zink et al. | |
| 6,148,183 A | 11/2000 | Higdon et al. | |
| 6,489,580 B2 * | 12/2002 | Yanai | ................... H01H 1/5805 200/292 |

(Continued)

FOREIGN PATENT DOCUMENTS

| | | |
|---|---|---|
| FR | 2890523 A1 | 3/2007 |
| GB | 2237146 A | 4/1991 |

(Continued)

OTHER PUBLICATIONS

"Nxp Sod882d Package With Reduced Height and Innovative Pad Design", NXP, Jun. 2011, 4 pages.

(Continued)

*Primary Examiner* — Edwin A. Leon
(74) *Attorney, Agent, or Firm* — Harrington & Smith

(57) ABSTRACT

An apparatus and system for a side actuator arrangement as well as a substrate, and method of manufacturing, for a side actuator arrangement. The apparatus includes a first part and a second part. The first part is configured to mechanically interlock with an edge of a substrate so as to prevent movement of the apparatus with respect to the substrate in a direction parallel to the edge of the substrate. The second part is configured to receive an actuatable conductive member such that, when the conductive member is actuated, the conductive member is able to be brought into contact with at least a first region of the edge of the substrate.

14 Claims, 7 Drawing Sheets

(56) References Cited

U.S. PATENT DOCUMENTS

| | | | |
|---|---|---|---|
| 6,590,778 B1 * | 7/2003 | Hojo | G06K 19/073 |
| | | | 257/679 |
| 6,753,486 B2 * | 6/2004 | Matsui | H01H 1/5805 |
| | | | 200/282 |
| 8,089,776 B2 | 1/2012 | Kjerrman et al. | |
| 2005/0272491 A1 * | 12/2005 | Jeon | H01H 13/705 |
| | | | 455/575.8 |
| 2011/0122586 A1 | 5/2011 | Kim et al. | |

FOREIGN PATENT DOCUMENTS

| | | |
|---|---|---|
| GB | 2338831 A | 12/1999 |
| JP | 03-68328 U | 7/1991 |
| KR | 10-0774924 B1 | 11/2007 |
| WO | 2007/148153 A1 | 12/2007 |
| WO | 2012/115284 A1 | 8/2012 |

OTHER PUBLICATIONS

Search Report received for corresponding United Kingdom Patent Application No. 1316311.8, dated Mar. 10, 2014, 5 pages.

* cited by examiner

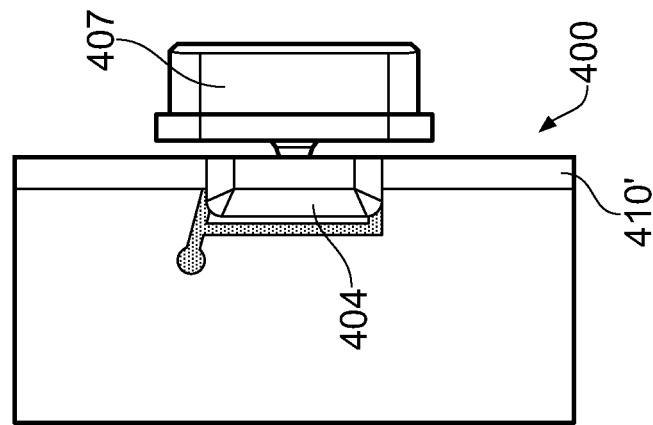
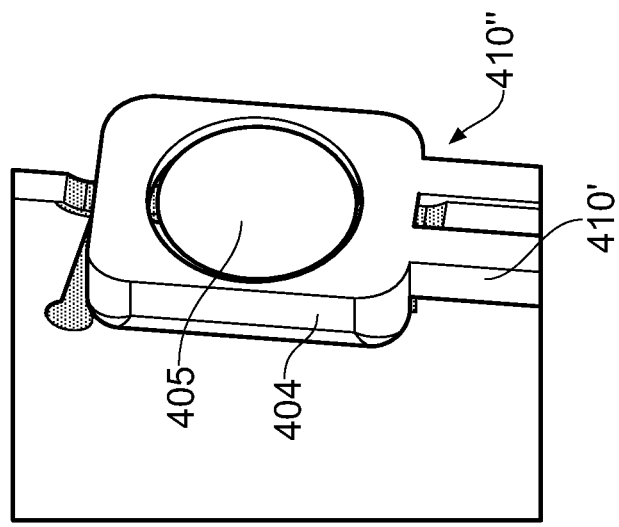
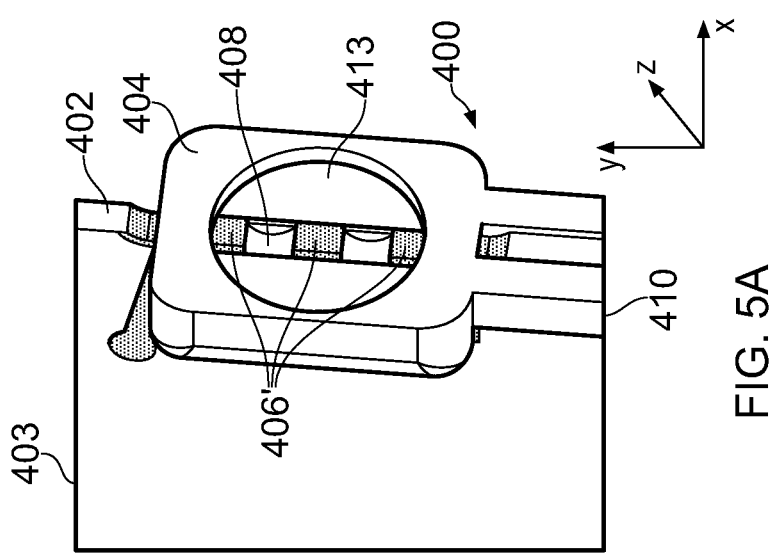

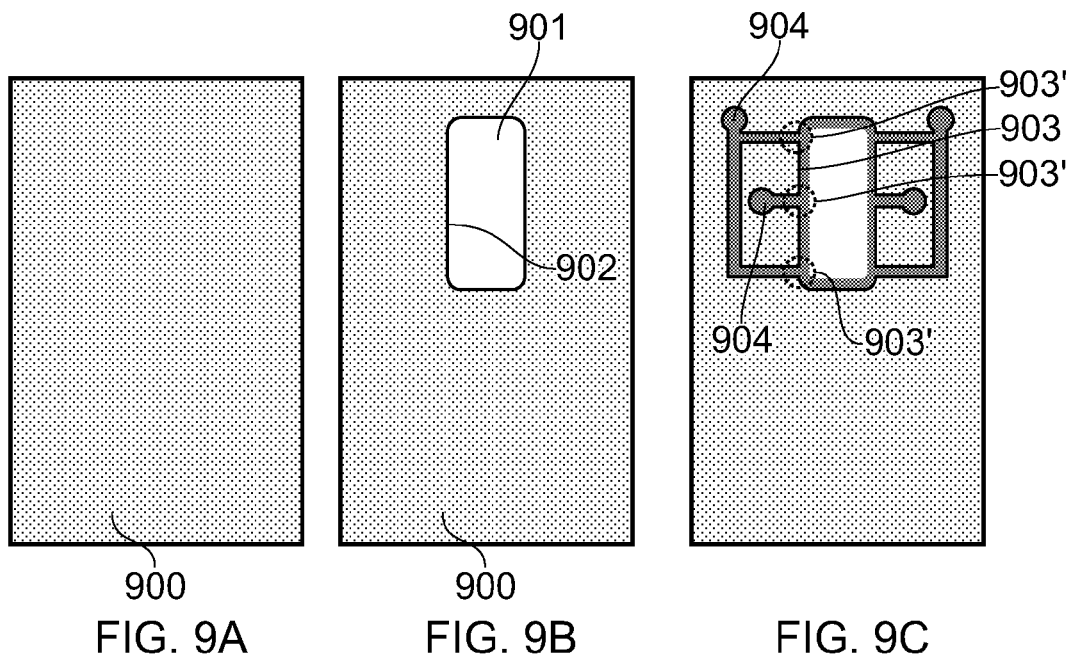
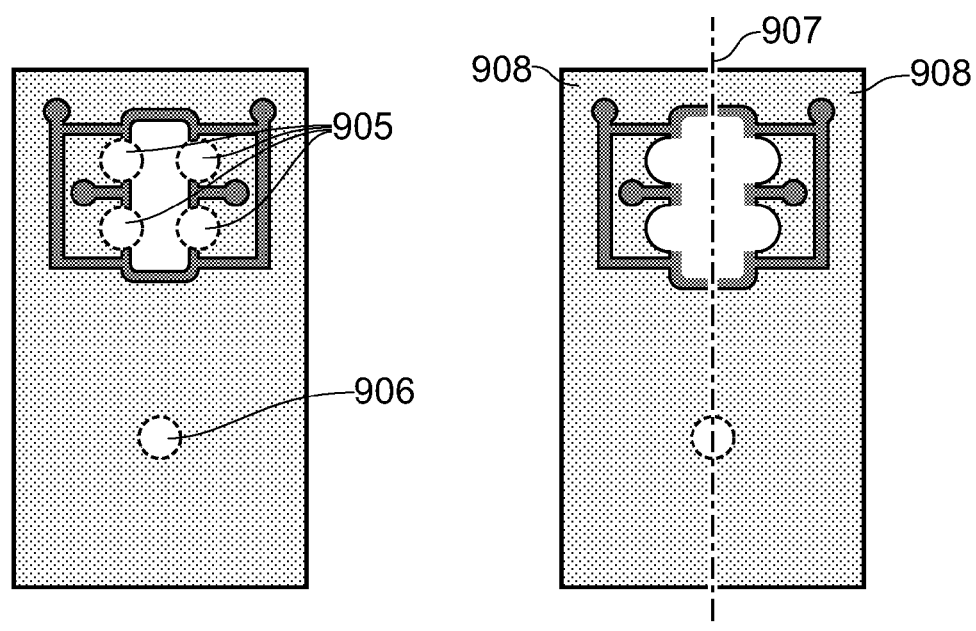
FIG. 9A   FIG. 9B   FIG. 9C
FIG. 9D   FIG. 9E

APPARATUS, SYSTEM AND METHOD FOR A SIDE ACTUATOR ARRANGEMENT

TECHNOLOGICAL FIELD

Embodiments of the present invention relate to an apparatus and system for a side actuator arrangement as well as a method of manufacturing a substrate for a side actuator arrangement.

BACKGROUND

Devices, such as portable electronic devices, having side switches/buttons (for example a mobile phone comprising a power button and volume buttons located on a side of the phone) are known. However, previous side switches required various electrical components (for example a flex foil, flexible wired board and/or other dedicated circuitry) and mechanical components which not only take up space within the limited confines of the device but also required careful assembly to ensure the correct positioning and alignment of the various components. Accordingly, conventional side switch systems are not always optimal.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

Various aspects of examples of the invention are set out in the claims.

According to at least some examples of the invention there is provided an apparatus comprising: a first part configured to mechanically interlock with an edge of a substrate so as to prevent movement of the apparatus with respect to the substrate in a direction parallel to the edge of the substrate; and a second part configured to receive an actuatable conductive member such that, when the conductive member is actuated, the conductive member is able to be brought into contact with at least a first region of the edge of the substrate.

According to at least some examples of the invention there is provided an apparatus comprising means configured to: mechanically interlock with an edge of a substrate so as to prevent movement of the apparatus with respect to the substrate in a direction parallel to the edge of the substrate, and means configured to receive an actuatable conductive means such that, when the conductive means is actuated, the conductive means is able to be brought into contact with at least a first region of the edge of the substrate.

According to at least some examples of the invention there is provided a module comprising the apparatuses above. According to at least some examples of the invention there is provided a device or a system comprising the apparatuses or module above.

According to at least some examples of the invention there is provided a method of manufacturing a substrate comprising: creating an aperture through a primary substrate; providing a layer of a conductive medium to an internal wall of the aperture; and removing at least a section of the internal wall along with a respective section of the layer of the conductive medium.

According to at least some examples of the invention there is provided a substrate manufactured according to the method above.

According to at least some examples of the invention there is provided an apparatus comprising means for manufacturing the substrate according to the method above. According to at least some examples of the invention there is provided a computer program that, when performed by at least one processor, causes the method above to be performed.

BRIEF DESCRIPTION OF THE DRAWINGS

For a better understanding of various examples that are useful for understanding the present invention reference will now be made by way of example only to the accompanying drawings in which:

FIGS. 5A-C illustrate an example of a conductive member housing and a side support member of the apparatus of FIGS. 4A-C;

FIGS. 9A-E schematically illustrate manufacturing processes of the method of FIG. 8.

DETAILED DESCRIPTION

Figure 1:
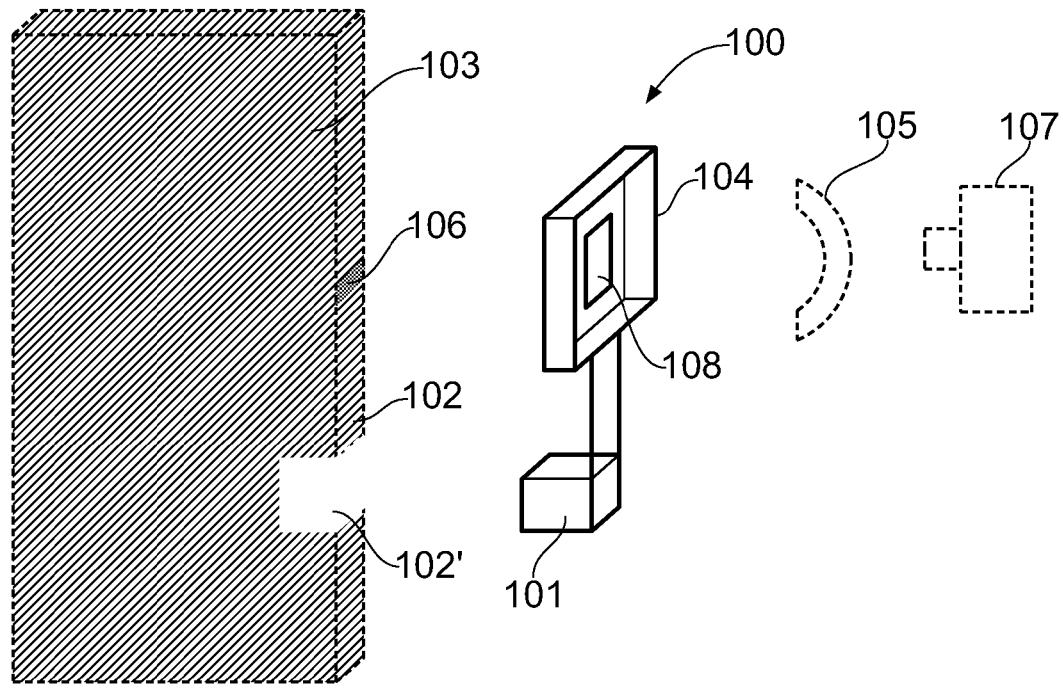
FIG. 1 schematically illustrates an example of an apparatus.

The Figures schematically illustrate an apparatus (100) comprising:
 a first part (101) configured to mechanically interlock with an edge (102) of a substrate (103) so as to prevent movement of the apparatus with respect to the substrate in a direction parallel to the edge of the substrate, and
 a second part (104) configured to receive an actuatable conductive member (105) such that, when the conductive member is actuated, the conductive member is able to be brought into contact with at least a first region (106) of the edge of the substrate.

The apparatus may be suitable for a side actuator arrangement (100, 103, 105, 107).

By way of example, in one particular embodiment of the invention, the apparatus 100 is used in a side switch arrangement 100, 103, 105, 107 for a device 700. The device may be a handheld electronic device.

The apparatus 100 comprises an elongate rigid mechanical supporting and guiding structure configured to abut against an edge 102 of the substrate 103. The substrate may be a printed circuit board (PCB) of the handheld electronic device. The first part 101 of the supporting structure is a protrusion which mechanically interlocks with a corresponding recession/hole/notch 102' in the PCB's edge thereby securing the supporting structure in position with respect to the PCB and preventing movement of the supporting structure along the edge. This also acts to guide the alignment and positioning of the apparatus with respect to the PCB's edge. The second part 104 of the support structure supports and holds the conductive medium 105, which may be a metallic dome. The second part has an aperture 108 therethrough to enable the dome, when actuated, to be brought into direct physical contact with the first region 106 of the PCB's edge. The first region of the edge is provided with a pad, e.g. a conductive layer. When the dome is not actuated the side switch arrangement is configured such that the dome is not in contact with the edge's pad. However, when actuated by a switch cap 107, the dome is brought into contact with the pad making an electrical connection between the dome and the pad to provide a switch/key/button function.

Examples of the invention advantageously provide a mechanical support and guiding member which enables the conductive member and the substrate to be kept in secure relative position with respect to one another thereby guiding and ensuring correct alignment of the conductive member and the region at which the conductive member contacts the edge when actuated. Moreover, such securement and alignment may be achieved without the requirements for additional fixing means such as adhesives and screws. Examples of the invention enable fewer components to be used, e.g. no requirement for an intermediary flexible wiring board to connect a side switch to a PCB nor a requirement for screws/adhesive to secure components in place. Thus, not only do examples enable the alignment/positioning of components and assembly process to be simplified, but also less space and fewer components are required.

Examples of the apparatus 100, the substrate 103 as well as a method for manufacturing the substrate will now be described with reference to the Figures. Similar reference numerals are used in the Figures to designate similar features. For clarity, all reference numerals are not necessarily displayed in all figures.

FIG. 1 schematically illustrates a diagram of an apparatus 100 for a side actuator arrangement 100, 103, 105, 107 according to an example of the invention. FIG. 1 focuses on the functional components necessary for describing the operation of the apparatus 100.

The apparatus has a first part 101 comprising a protrusion which projects from the apparatus and is configured for insertion into and to mechanically interlock with a correspondingly shaped recession/hole/notch 102' in an edge 102 of a substrate 103 (shown in outline). This mechanical interlock with the substrate's edge prevents movement of the apparatus with respect to the substrate in a direction parallel to the edge of the substrate.

The substrate may comprise electrical circuitry and may be for example: a Printed Circuit Board (PCB), Printed Wired Board (PWB), Flexible Wired Board, circuit board or other substrate for supporting electrical components.

The apparatus also has a second part 104 configured to receive and hold in position a conductive member 105 (shown in outline). The conductive member is actuatable via an actuation mechanism 107 (shown in outline), such as a switch cap. The second part 104 is configured such, in use when the apparatus is abutted against edge of the substrate, when the conductive member is actuated, the conductive member is contactable against a first region 106 of the edge of the substrate (see FIG. 3B). In this regard, a seat of the second part on which the conductive member rests comprises an aperture 108 through which the conductive member, when actuated, can be brought into direct physical contact with the first region 106 of the edge 102. The first region may be provided with a layer of a conductive medium which may itself be electrically connected to further electrical components and/or circuitry, for example so as to effect switch/button functionality when the electrical connection is made upon user actuation.

Figure 2:
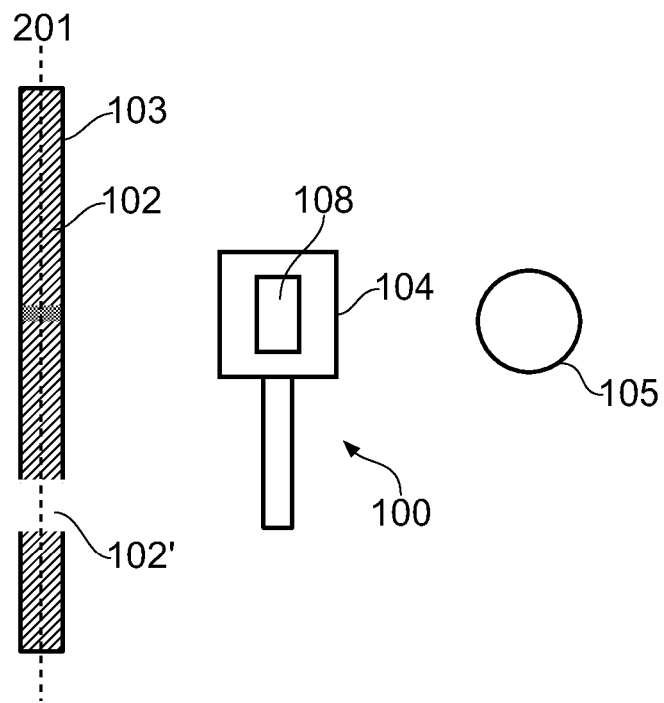
FIG. 2 schematically illustrates a side elevation view of the elements of FIG. 1.

FIG. 2 schematically illustrates a side elevation view of each of: the apparatus 100, the substrate 103 and the conductive member 105. In this example, the conductive member is shown as a circular dome having a concave shape. The dome's concave shape means that its internal central portion is not in contact with the first region 106 in a non-actuated configuration (see FIG. 3A). However, when actuated by the actuating mechanism 107, the dome is deformed such that its internal central portion is brought into contact with the region 106 of the edge making an electrical connection between the dome and the region 106 to provide a switch/key/button functionality (see FIG. 3B).

The conductive member need not take the form of a dome but could instead be another shape. Spacing means and/or biasing means could be used to prevent the conductive medium from contacting the first region 106 until actuated such that in a first (non-actuated) configuration the conductive member is not in contact with the edge region 106 but in a second (actuated) configuration the conductive member is in contact with the edge.

Figures 3A, 3B:
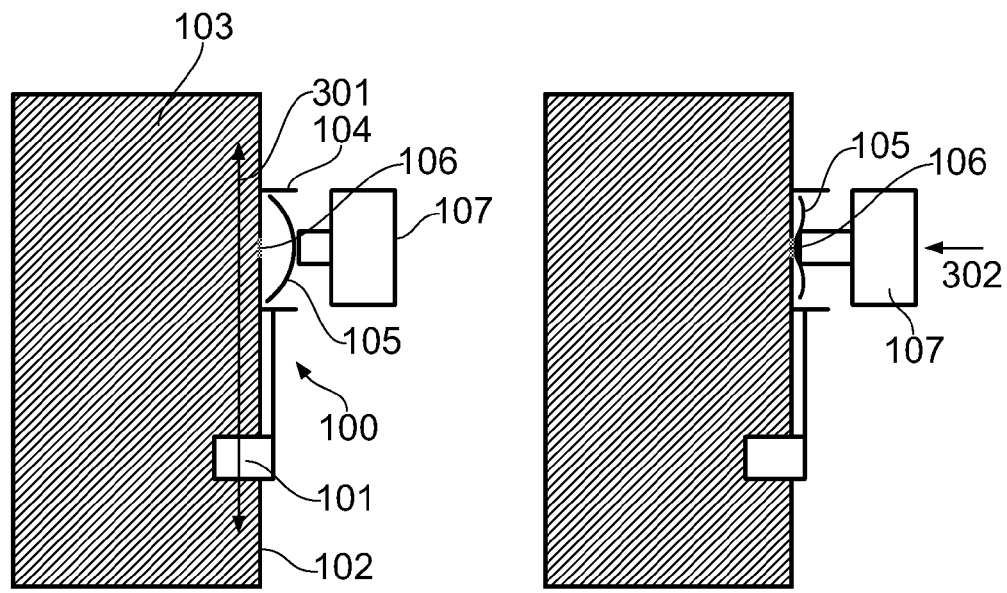
FIGS. 3A and 3B schematically illustrate a cross-sectional view of the assembled elements of FIG. 2 in each of a non-actuated and an actuated configuration.

FIGS. 3A and 3B schematically illustrates a cross sectional view of the elements of FIG. 2 along the line 201 in an assembled form, namely wherein the apparatus 100 abuts against the edge 102 of the substrate 103 and the protrusion 101 is inserted and interlocked with the recession 102' of the edge so as to prevent movement in a direction parallel to the edge (as shown by the double headed arrow 301).

FIG. 3A shows the assembly in a non-actuated configuration where the conductive member 105 is not in contact with the first region 106 of the edge 102 of the substrate 103. FIG. 3B shows the assembly in an actuated configuration in which the actuating mechanism, having been user actuated (as represented by arrow 302), causes the conductive member 105 to be brought into contact with the region 106 of the edge 102.

The apparatus 100 may be provided in a module. As used here 'module' refers to a unit or apparatus that excludes certain parts/components that would be added by an end manufacturer or a user, for example, such additional parts could comprise the conductive member, actuation mechanism and substrate.

In one example, the apparatus 100 is embodied in a device. The device may be, for example, at least one of: an electronic device, a portable device, a handheld device and a mobile communication device. The device may be a mobile telephone, tablet, personal digital assistant, or mobile computing device that may additionally provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. Moving Picture Experts Group-1 Audio Layer 3 (MP3) or other format and/or (frequency modulation/amplitude modulation) radio broadcast recording/playing), downloading/sending of data functions, image capture function (e.g. using a (e.g. in-built) digital camera), and gaming functions.

Figures 4A, 4B, 4C:
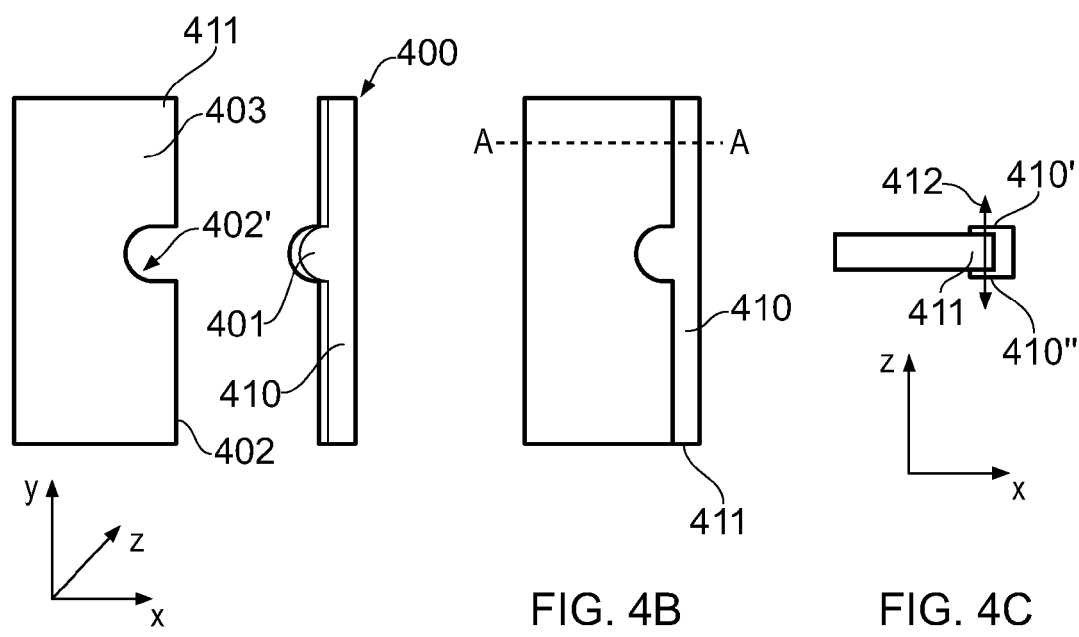
FIGS. 4A-C illustrate an example of an interlocking member and side support member of an apparatus.

FIGS. 4A and 4B illustrate partial views of a further example of a first part/edge interlocking member 401 of an apparatus 400 and a third part/side support member 410 (the second part/housing member for receiving a conductive member is not shown). The protrusion 401 of the first part has a curved shape which facilitates its insertion into the complementarily shaped recession 402' of the edge 402 of the substrate 403 and prevent movement in a direction along the length of the edge (i.e. along the y axis). The third part/side support member 410 is configured to receive a portion of the substrates sides 411 which are proximal to the substrate's edge 402 and mechanically/frictionally interengage therewith so as to prevent movement of the apparatus with respect to the substrate in a direction perpendicular to a major plane of the substrate (i.e. along the z axis). Movement along the x axis may be prevented by a cover of a device when the apparatus and side actuator arrangement is assembled therein.

FIG. 4C illustrates a cross sectional cut through along the line A-A of FIG. 4B. This shows a first portion 410' and a second portion 410" of the third part side support member 410 which are configured to receive the side portion 411 at the substrate's edge 402 therebetween, i.e. to cover both sides of the substrate at the edge region. The first and second portions act as supporting guide rails to receive and secure the edge/ridge of the substrate and prevent movement of the substrate relative to the apparatus in a direction perpendicular to the edge and perpendicular to the plane of the substrate, as represented by double headed arrow 412. The first and second portions may extend substantially along the entire length of the apparatus.

FIGS. 5A-C illustrate partial views of an example of a second part/conductive member housing 404 and third part/ side support member 410 of the apparatus 400 of FIGS. 4A-C (the first part/interlocking member is not shown). As shown in FIG. 5A, the conductive member housing 404 and side support member 410 are configured to receive the edge 402 of the substrate 403 and frictionally interengage therewith. This not only provides a guide so as to appropriately position the apparatus 400 and its second part 404 with respect to the substrate, but also prevents movement of the apparatus with respect to the substrate in a z direction, perpendicular to the major plane of the substrate. The conductive member housing third part 404 provides a seat 413 on which the conductive member 405 may rest surrounded by side walls which hold the conductive member in place. The shape of the seat and side wall may be configured to correspond to the shape of the conductive member. The conductive member housing comprises an aperture 408 therethrough providing access for the conductive member 405 to contact a region of the edge 402 of the substrate 403 when actuated by an actuation mechanism 407. The contact region of the edge may comprise a plurality of individual contact areas 406', in this particular example 3 contact areas/pads, against which the conductive medium contacts when actuated.

FIG. 5B shows the apparatus of FIG. 5A with the conductive member 405 received and supported within the housing 404. FIG. 5C shows a front elevation view of the apparatus 400 in which the edge is inserted into and received by the guide rails 410' and 410" of the third part 410 to secure to the substrate. This Figure also shows an actuation mechanism 407, e.g. switch cap, for actuating the conductive member.

Figure 6:
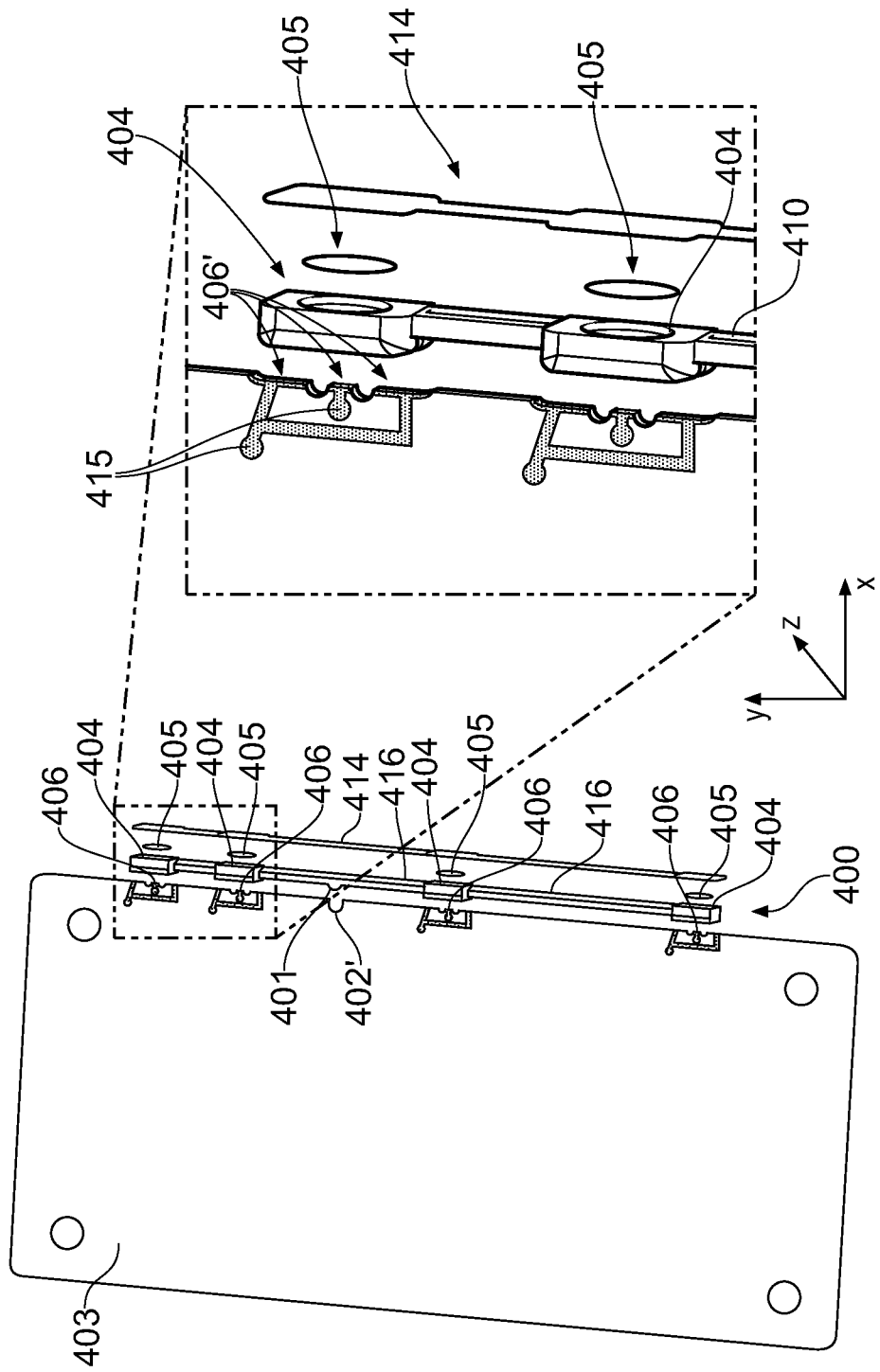
FIG. 6 illustrates an example of a side actuator arrangement including the apparatus of FIGS. 4A-C and 5A-C.

FIG. 6 illustrates an example of a side actuator arrangement including the first part 401 FIGS. 4A-C and second part 404 of FIGS. 5A-C. The elongate apparatus 400 comprises along its length a plurality of second parts 404 for housing and securing a respective plurality of conductive members 405 for actuatable contact with a respective plurality of regions 406 of the edge of the substrate.

The apparatus 400 is configured such that a separation between the various second parts corresponds to a separation between the corresponding edge contact regions 406 of the substrate 403, each contact region 406 comprising a plurality of contact areas 406'. The edge interlocking member first part 401, conductive member housing second part 404 and side support third part 410 mechanically interlock with and interengage with the recession 402' of the edge 402 of the substrate 403 to secure and hold the apparatus 400 in place preventing movement of the apparatus with respect to the substrate in y and z directions. In this manner, the apparatus 400 acts as a mechanical guide and support for the conductive members 405 so as to ensure their correct positioning and alignment with respect to the contact edge regions 406 of the substrate both in an y and z direction. An insulating sheet 414 may be interposed between the apparatus and the actuating mechanisms (not shown).

As shown in the expanded detail view, each first region 406 comprises a plurality of contact areas 406', i.e. 3 side pads in this particular example. The arrangement of the housing member 404, conductive member 405 and actuation mechanism may be configured such that, upon user actuation, the conductive member is brought into contact with all of the plurality of contact areas 406' of a contact region 406 to electrically connect the contact areas together. The contact areas themselves may be provided with electrical contacts 415, e.g. traces, for electrical connection to other circuitry/ electrical components.

The first, second and third parts 401, 404 and 410 of the apparatus 400 may be integrally formed and may form a unitary mechanical support and guide member. The sections 416 of the apparatus which interconnect the various parts may be rigid or substantially rigid.

Figure 7A:
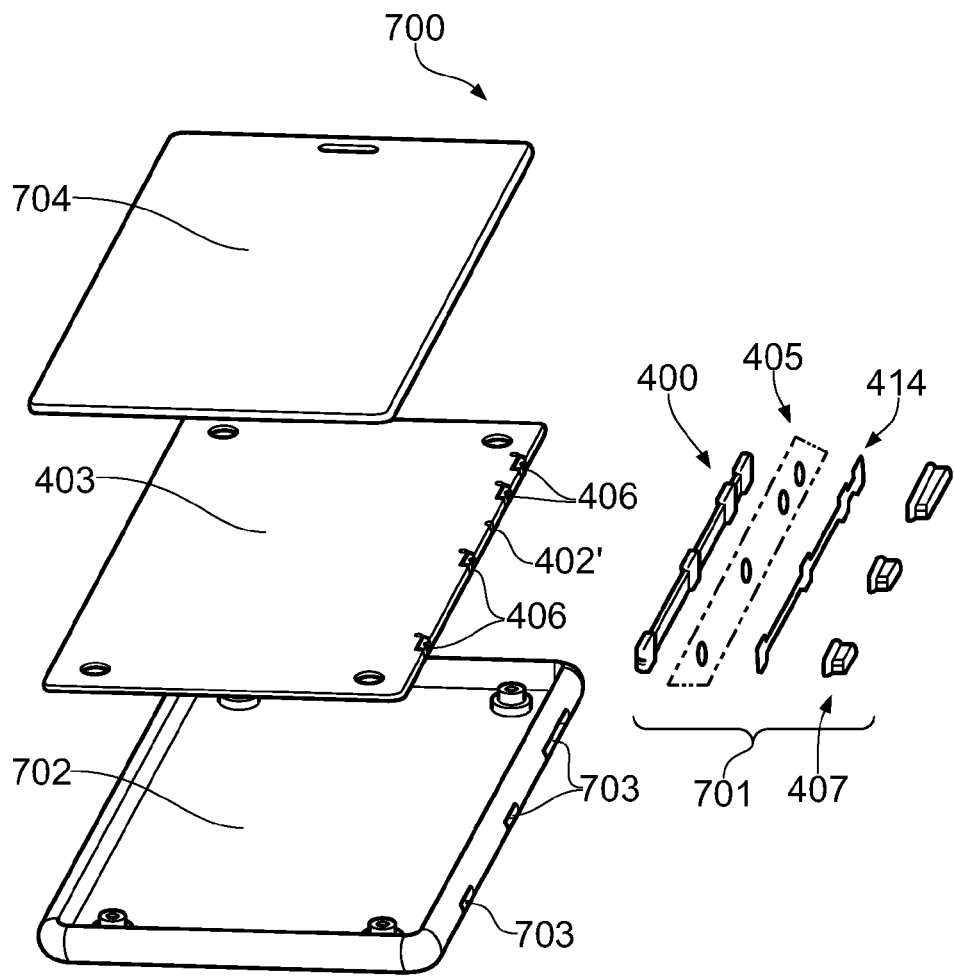
FIGS. 7A-C illustrate a device comprising the side actuator arrangement of FIG. 6.
Figure 7B:
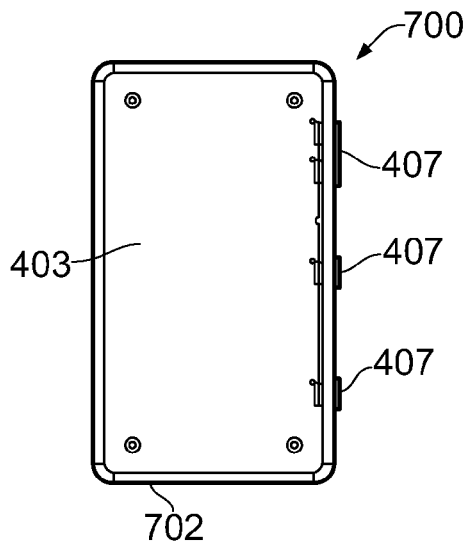
Figure 7C:
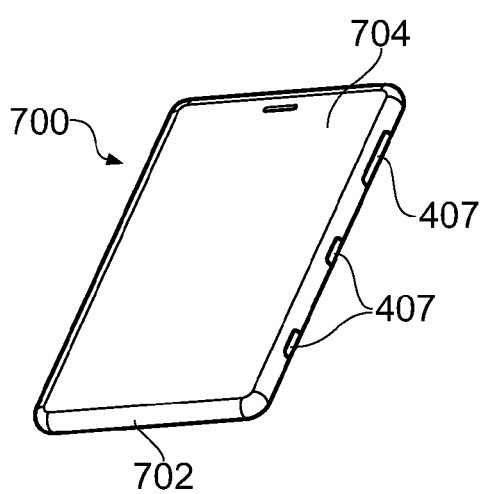

FIGS. 7A-C illustrate a device 700 comprising a system 701 for a side actuator arrangement. The system 701 comprises an actuator assembly comprising the apparatus 400 along with at least one of: one or more conductive members 405, one or more actuator mechanisms 407 and an insulator 414. The system 701 may further comprise the substrate 403. The apparatus 400 is attached to the substrate 403 with the first part 401 acting as a registration guide to ensure appropriate positioning of the apparatus and its conductive member housings 404 with respect to the substrate's edge and its edge contact regions 406. The first part 401, in combination with the third part 410, also secures the apparatus into a secure and fixed position with respect to the substrate and aides alignment of the assembly with respect to the substrate. The actuator assembly and the substrate are positioned within and secured to a cover 702 of the device, as shown in FIG. 7B. Apertures 703 are provided within a side of the cover for user access to the actuator mechanisms/ switch caps 407. In this manner, the cover also serves to support the switch caps and prevent lateral movement (in an x direction) of elements of the actuator assembly.

Additional components may be provided within the cover, such as a display. The device may be enclosed by a front panel 704 as shown in FIG. 7C.

The contact areas/pads 406' of the regions 406 of the edge 402 of the substrate 402 may be provided to the substrate during the manufacture of the substrate. For example during the manufacturing process at the same time that other pads, electrical contacts and vias are provided to the substrate to create a PCB or PWB.

With regards to the method flow chart of FIG. 8 and the manufacturing processes of FIGS. 9A-E, a method 800 of manufacturing a substrate for a side actuator arrangement will now be described. In block 801, an aperture 901 is created in a major face of a primary substrate 900. In block 802, a layer of a conductive medium 903 is provided to an internal wall 902 of the aperture 901. In block 803, one or more electrical contacts 904 are provided to one or more portions of the layer of the conductive medium 903' for electrical connection to further circuitry, e.g. for enabling the functionality of a button/switch. In block 804, one or more sections of the internal wall 905, along with respective associated one or more sections of the layer of the conductive medium, are removed. In block 805 a further aperture 906 is created within the major face of the primary substrate. It will be appreciated that this aperture forms the recession/notch 102', 402' with which the first part 102,402 of the apparatus interlocks.

In block 806 a cut is made through the primary substrate such that a line of the cut 907 passes through the aperture 901 and the further aperture 906 to form two secondary substrates 908 for use with the apparatus 100, 400 as described above.

Figure 8:
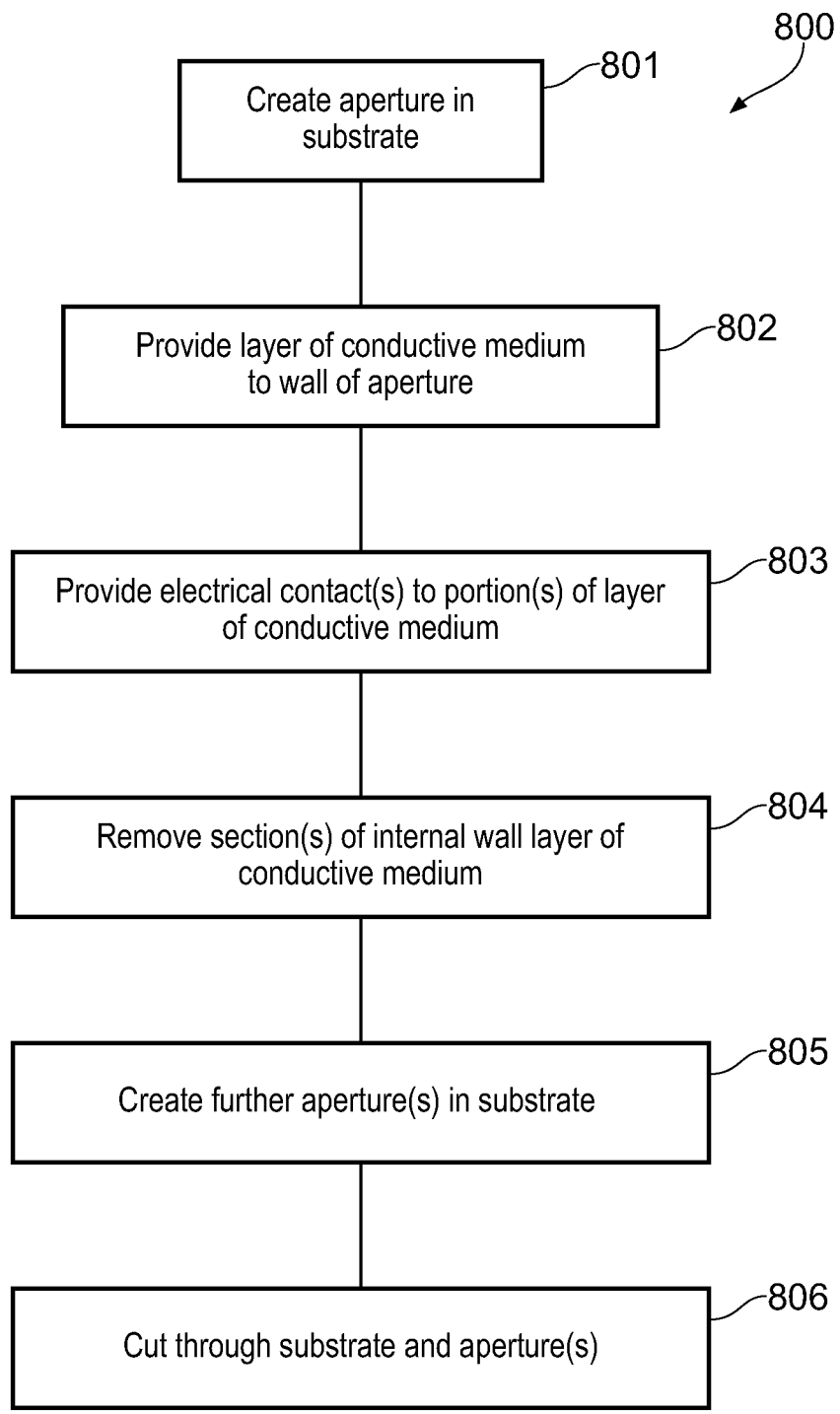
FIG. 8 schematically illustrates an example of a method of manufacturing a substrate for a side actuator arrangement.

The flowchart of FIG. 8 represents one possible scenario among others. The illustration of a particular order to the blocks does not necessarily imply that there is a required or preferred order for the blocks and the order and arrangement of the block may be varied. Furthermore, it may be possible for some blocks to be omitted.

In certain examples one or more blocks may be performed in a different order or overlapping in time, in series or in parallel one or more blocks may be omitted or added or changed in some combination of ways.

The example of FIG. 8 is described using a flowchart of blocks. It will be understood that each block and combinations of blocks, can be implemented by an apparatus/machine suitable for implementing the functions specified in the blocks under the control of computer program instructions of a computer program. These program instructions may be provided to one or more controllers or processors such that the instructions which execute on the processor(s) create means for implementing the functions specified in the block or blocks. The computer program instructions may be executed by the processor(s) to cause a series of operational steps to be performed by the computer controllable apparatus/machining tool to produce a computer implemented process such that the instructions which execute on the processor(s) provide steps for implementing the functions specified in the block or blocks so as to give rise to the production of an article of manufacture, namely the substrate.

Accordingly, the blocks support: combinations of means for performing the specified functions; combinations of steps for performing the specified functions; and computer program instructions for performing the specified functions. It will also be understood that each block, and combinations of blocks, can be implemented by special purpose hardware-based systems which perform the specified functions or steps, or combinations of special purpose hardware and computer program instructions.

Thus, the blocks illustrated in FIG. 8 may represent steps in a method and/or sections of instructions/code in a computer program.

According to one aspect of the invention there is provided an apparatus and/or means for performing the method of FIG. 8. According to a further aspect of the invention there is provided a computer program that, when performed by at least one processor, causes the method of FIG. 8 to be performed.

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class.

In this description, the wording 'connect', 'couple' and their derivatives mean operationally connected/coupled. It should be appreciated that any number or combination of intervening components can exist (including no intervening components).

The term 'comprise' is used in this document with an inclusive not an exclusive meaning. That is any reference to X comprising Y indicates that X may comprise only one X or may comprise more than one X. If it is intended to use 'comprise' with an exclusive meaning then it will be made clear in the context by referring to "comprising only one . . . " or by using "consisting".

Examples have been described above in terms of comprising various components. It should be understood that the components may be one of more of any device or means configured to perform the corresponding functions of the respective components as described in greater detail above.

Features described in the preceding description may be used in combinations other than the combinations explicitly described.

Although functions have been described with reference to certain features, those functions may be performable by other features whether described or not. Although features have been described with reference to certain examples, those features may also be present in other examples whether described or not. Although various examples of the present invention have been described it should be appreciated that modifications to the examples given can be made without departing from the scope of the invention as claimed.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
a first part configured to mechanically interlock with an edge of a substrate so as to prevent movement of the apparatus with respect to the substrate in a direction parallel to the edge of the substrate, wherein the first part comprises a protrusion configured to be inserted into a recession in the edge of the substrate; and
a second part configured to receive an actuatable conductive member such that, when the conductive member is actuated, the conductive member is able to be brought into contact with at least a first region of the edge of the substrate, and wherein the second part is configured to be spaced from the recession in the edge of the substrate.

2. The apparatus as claimed in claim 1, wherein the second part comprises an aperture therethrough.

3. The apparatus as claimed in claim 1, further comprising a third part configured to receive a portion of the substrate edge and mechanically inter-engage therewith so as to prevent movement of the apparatus with respect to the substrate in a direction perpendicular to a major plane of the substrate.

4. The apparatus as claimed in claim 3, wherein the third part comprises a first portion and a second portion configured to receive the portion of the substrate edge therebetween.

5. The apparatus as claimed in claim 3, wherein the third part extends substantially along the length of the apparatus.

6. The apparatus as claimed in claim 1, further comprising a plurality of second parts configured to receive a plurality of actuatable conductive members such that, when each of the plurality of conductive members is actuated, each of the plurality of conductive members is able to contact respective plurality of regions of the edge of the substrate.

7. A module comprising the apparatus of claim 1.

8. A device comprising the module of claim 7.

9. A system comprising:
the apparatus as claimed in claim 1; and
at least one conductive member, where the at least one conductive member comprises the actuatable conductive member.

10. The system as claimed in claim 9, further comprising:
at least one actuator mechanism configured to actuate the at least one conductive member.

11. The system as claimed in claim 9, further comprising:
the substrate comprising a recession in the edge thereof.

12. The system as claimed in claim 9, wherein the system is comprised in a mobile device.

13. A device comprising an apparatus comprising:
a first part configured to mechanically interlock with an edge of a substrate so as to prevent movement of the apparatus with respect to the substrate in a direction parallel to the edge of the substrate, wherein the first part comprises a protrusion configured to be inserted into a recession in the edge of the substrate; and
a second part configured to receive an actuatable conductive member such that, when the conductive member is actuated, the conductive member is able to be brought into contact with at least a first region of the edge of the substrate, and wherein the second part is configured to be spaced from the recession in the edge of the substrate.

14. The device of claim 13, wherein the device is configured for at least one of: portable handheld use, wireless communication and mobile telephony.

* * * * *